April 17, 1962 J. JAUQUET 3,030,114

SOUND REPRODUCER APPARATUSES

Filed Sept. 16, 1958 2 Sheets-Sheet 1

INVENTOR
Juan Jacquet

BY
Michael S. Striker
ATTORNEY

April 17, 1962 J. JAUQUET 3,030,114

SOUND REPRODUCER APPARATUSES

Filed Sept. 16, 1958 2 Sheets-Sheet 2

INVENTOR
Juan Jacquet

BY Michael S. Striker
ATTORNEY 3,030,114
SOUND REPRODUCER APPARATUSES
Juan Jauquet, 8 Virgilio St., Mexico City 5, Mexico
Filed Sept. 16, 1958, Ser. No. 761,388
2 Claims. (Cl. 274—9)

The present invention relates to sound reproducing apparatus. More particularly, the invention relates to sound reproducing apparatus for reproducing words or songs which functions automatically after initial manual control so that it is especially suitable for use inside a box or a doll body.

In order that the present invention may be readily carried into effect, it will now be described with reference to the accompanying drawings, wherein.

Figures 1, 2, 3, 4, 5, 6:
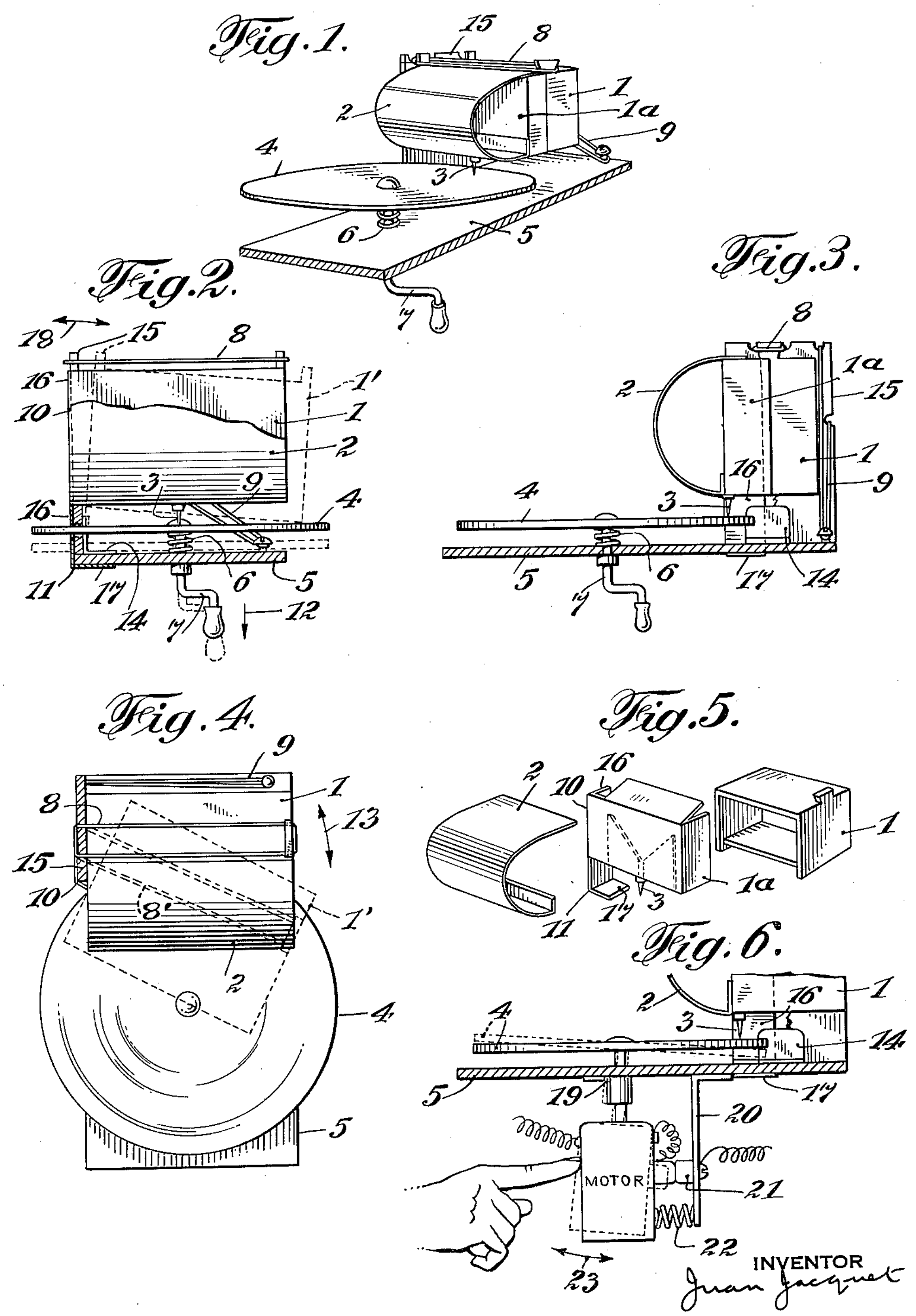
FIG. 1 is a perspective view of an embodiment of the sound reproducing apparatus of the present invention.
FIG. 2 is a front view of the embodiment of FIG. 1.
FIG. 3 is a side view of the embodiment of FIG. 1.
FIG. 4 is a top view of the embodiment of FIG. 1.
FIG. 5 is an exploded view in perspective of selected components of the embodiment of FIG. 1.
FIG. 6 is a side view of a modification of the embodiment of FIGS. 1, 2, 3 and 4.
Figure 7:
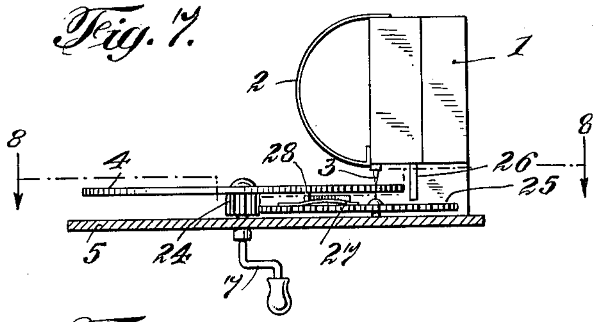
FIG. 7 is a side view of another embodiment of the sound reproducing apparatus of the present invention.
Figure 8:
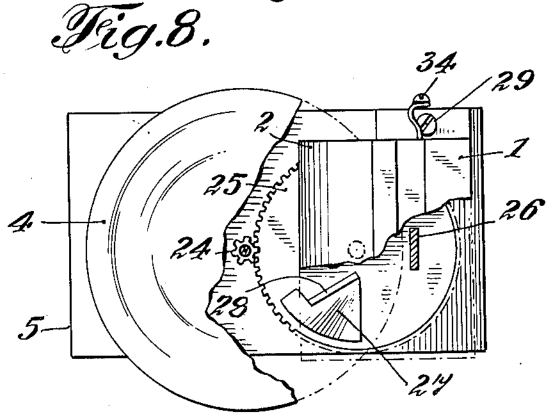
FIG. 8 is a top view, partly in section, of the embodiment of FIG. 7, taken along the line 8—8 of FIG. 7.

In FIG. 1, the sound reproducing apparatus comprises a sound amplifier composed of three principal parts, 1, 1*a* and 2 (FIGS. 1 and 5). Part 1 is a cardboard box or a box of another material, open in its front part with a narrower base than the box. The part 1*a* is of a thin material which is relatively thinner than that of the box 1 and carries a phonograph needle 3. The part 1*a* should be affixed to the box 1, thereby to provide a sound reproducer. The amplifier part is constituted by a sheet of paper, plastic or other flexible material 2 which is affixed at its lower edge to the vibrating part of the part 1*a* and is affixed at its upper edge to the firm part of the box 1 as seen clearly in FIG. 3.

The sound reproducer is affixed to a platform 15 (FIGS. 1, 3 and 4) by foot 16 of the vibrating part 1*a* (FIG. 5) so that it can rotate around fold 10 as indicated by arrow 13 (FIG. 4). This rotating movement allows the sound reproducer needle 3 to follow the groove of a record 4.

The platform 15 with the sound reproducer placed thereon is positioned on a base 5, foot 17 (FIG. 5) being affixed to the same base. Fold 11 (FIGS. 2 and 5) does the job of a hinge, allowing the reproducer and its support an oscillation movement indicated by arrow 18 (FIG. 2). An angle member 14 (FIGS. 2 and 3) mounted on the base 5 helps to avoid the descending of the support and sound reproducer to a certain level as indicated in the drawing.

A rubberband 8 (FIGS. 1, 2, 3 and 4) joining the upper part of the support 15 and the upper part of the sound reproducer lightly urges said sound reproducer toward said support. When a rotational movement is imparted to record 4 by means of a crankshaft 7, the needle 3 follows the groove in said record, thereby imparting to the sound reproducer a rotation movement as indicated by arrow 13 (FIG. 4). In this case, the rubberband 8 stretches slightly as indicated by 8′ (FIG. 4).

A rubberband 9 (FIGS. 1 to 4) joined to the upper part of the support 15 and to the base 5, lightly urges the sound reproducer downward thereby imparting a certain pressure to the needle 3 on the record 4.

Crankshaft 7 is fixedly connected to the record 4 and is rotatably mounted in an aperture through the base 5. Between the base 5 and the record 4 is a spring 6 (FIGS. 1 to 3). When the needle 3 of the sound reproducer comes to the end of the recording, that is, to the center of the record 4, it will be sufficient to lightly urge the crankshaft 7 downward as indicated by arrow 12 (FIG. 2) so that said needle frees itself from the groove in the record and returns to its starting point. When the record 4 is moved downward, the sound reproducer is also moved downward by the tension of the rubberband 9 as indicated by arrow 18 (FIG. 2) until it is held by the angle member 14. If the crankshaft 7 is pulled downward, the needle stays in the groove of the record 4. At such time, the sound reproducer is able to rotate freely over fold 10 (FIG. 4) which acts as a hinge, and the sound reproducer returns to the starting point under the urging of rubberband 8 (8′) (FIG. 4). When the crankshaft 7 is freed, the record 4 is returned to its upper position by the pressure of the spring 6, and the needle 3 of the sound reproducer automatically places itsely in the first groove of said record.

The sound reproducing apparatus may be manually controlled and may also be operated by a motor, in which case the needle 3 will be freed as indicated in FIG. 6. The shaft of the motor and the record 4 are rotatably mounted on the base 5 by means of a crankshaft 19 (FIG. 6). An angle member 20 supports an electrical contact 21 and a spring 22 which urges the motor away from the contact 21 so that the said contact and the motor contact do not join and the record 4 stays slanted in such a way that it leaves needle 3 free. When the contacts of the motor and the member 20 contact each other current flows and the motor runs. At such time, the record 4 has taken its normal position, that is, with the needle 3 in the first groove of said record and the apparatus will function until the motor is permitted to move so that its contact is separated from the contact 21.

Figure 9:
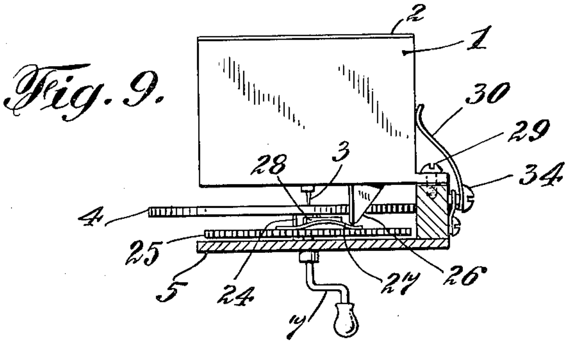
FIG. 9 is a back view, partly in section, of the embodiment of FIG. 7.
Figure 10:
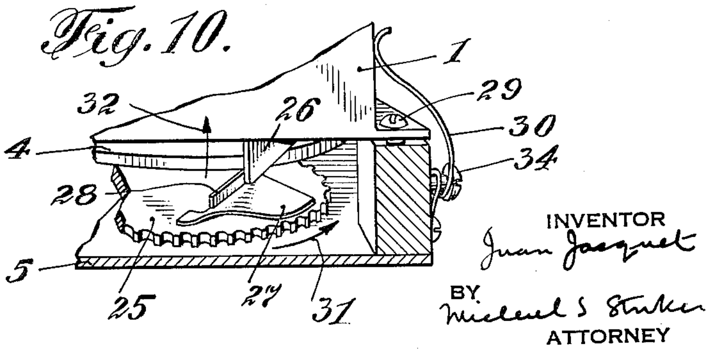
FIG. 10 is a perspective view of a portion of the embodiment of FIG. 7.

FIGS. 7, 8, 9 and 10 illustrate another embodiment of the sound reproducing apparatus of the present invention, in which another system for the automatic return of the needle is used. In this system, the record 4 (FIGS. 7 to 10) on its underside has a pinion 24 (FIGS. 7 and 8) which imparts rotational movement to the record from a gear 25 with which it is meshed (FIGS. 7 to 10). The gear 25 has on its upper side a curved or wavy-shaped member 27 (as indicated in the drawings) (FIGS. 7 to 10). The member 27 has on its upper surface a substantially perpendicular eyelash member 28 (FIG. 10).

When the gear 25 rotates in the direction indicated by arrow 31 (FIG. 10) the curved member 27 pushes first the substantially perpendicular eyelash member 26 which is affixed to the underside of the sound amplifier, thereby spacing the needle 3 from the record 4 (FIG. 10). Then the eyelash member 28 due to its slanting position pushes against the eyelash member 26. When the eyelash member 26 reaches the limit of its contact with the eyelash member 28, the eyelash member 28 automatically descends, thereby positioning the needle 3 at the edge of the record 4 again.

In this system, the sound amplifier 1 rotates around the axle 29 (FIGS. 8 to 10) instead of the hinge 10 of FIG. 4.

The pressure of the needle 3 on the record 4 is provided by a spring 30 (FIGS. 9 and 10). The pressure exerted by the spring 30 may be adjusted by adjustment of a screw 34 (FIGS. 9 and 10).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sound reproducing apparatus comprising, in combination, a support; a record disc member mounted on said support turnable about an axis and having on one surface thereof a spiral record groove extending from a peripheral portion of said record disc member toward a central portion thereof; a sound box member having a base and an open end and being formed at said base with a cutout extending from said open end into said base, said sound box member being made from sheet material of a selected thickness; first membrane means fixed to said sound box member and having a first portion covering said open end thereof and a second portion covering said cutout in said base and being made from sheet material of a thickness smaller than said selected thickness; second membrane means having a pair of edge portions attached to said sound box member and the unattached portion of said second membrane means extending spaced from said first portion of said first membrane means over said open end of said sound box member; a needle adapted to engage said groove of said record disc member and being carried by said second portion of said first membrane means, whereby sound waves created by said first membrane means during turning of said record will be amplified by said second membrane means; mounting means attached to said support and to said sound box member for mounting said sound box member turnable about an axis substantially parallel to the turning axis of said record disc member and with the base of said sound box member extending at least partly over said one surface of said record disc member; first resilient means attached to at least one of said members for resiliently pressing said one member agianst the other of said members so that said needle is resiliently held on said one surface of said record disc member in engagement with said groove thereon; means operatively connected to said record disc member for disengagement of said needle from said groove; means for turning said record disc member about the axis thereof so that during engagement of said needle with said groove said sound box member will turn from an outer starting position in which said needle is located in said peripheral groove portion toward an inner end position in which said needle is located in said central groove portion; and second resilient means operatively connected to said sound box member for turning the latter after disengagement of said needle from said groove to said starting position.

2. A sound reproducing apparatus comprising, in combination, a support; a record disc member mounted on said support turnable about an axis and having on one surface thereof a spiral record groove extending from peripheral portion of said record disc member toward a central portion thereof; a sound box member having a base and an open end and being formed at said base with a cutout extending from said open end into said base, said sound box member being made from sheet material of a selected thickness; first membrane means fixed to said sound box member and having a first portion covering said open end thereof and a second portion covering said cutout in said base and being made from sheet material of a thickness smaller than said selected thickness; second membrane means having a pair of edge portions attached to said sound box member and the unattached portion of said second membrane means extending spaced from said first portion of said first membrane means over said open end of said sound box member; a needle adapted to engage said groove of said record disc member and being carried by said second portion of said first membrane means, whereby sound waves created by said first membrane means during turning of said record will be amplified by said second membrane means; mounting means attached to said support and to said sound box member for mounting said sound box member turnable about an axis substantially parallel to the turning axis of said record disc member and with the base of said sound box member extending at least partly over said one surface of said record disc member; first resilient means attached to at least one of said members for resiliently pressing said one member against the other of said members so that said needle is resiliently held on said one surface of said record disc member in engagement with said groove thereon; means for turning said record disc member about the axis thereof so that during engagement of said needle with said groove said sound box member will turn from an outer starting position in which said needle is located in said peripheral groove portion toward an inner end position in which said needle is located in said central groove portion; cam means turnable about an axis substantially parallel to said turning axis of said record disc member; transmission means operatively connected to said disc member and to said cam means for turning said cam means at a speed slower than said record disc member is turned by said means for turning said record disc member; engaging means fixed to said sound box member and extending toward said cam means for engaging said cam means and for disengaging thereby said needle from said groove when said needle reaches said central portion of said groove; and second resilient means operatively connected to said sound box member for turning the latter after disengagement of said needle from said groove to said starting position.

References Cited in the file of this patent

UNITED STATES PATENTS

| | | |
|---|---|---|
| 1,178,840 | Cassard | Apr. 11, 1916 |
| 1,764,957 | Jakowski | June 17, 1930 |
| 2,033,729 | Monfort | Mar. 10, 1936 |